United States Patent [19]

Niskanen

[11] Patent Number: 4,793,250

[45] Date of Patent: Dec. 27, 1988

[54] METHOD AND APPARATUS FOR CONTROLLING DEFLECTION OF AN ADJUSTABLE CROWN ROLL

[75] Inventor: Juhani Niskanen, Jyväskylä, Finland

[73] Assignee: Valmet Oy, Finland

[21] Appl. No.: 36,100

[22] Filed: Apr. 8, 1987

[30] Foreign Application Priority Data

Apr. 9, 1986 [FI] Finland .................................. 861511

[51] Int. Cl.$^4$ ................................................ B30B 3/04
[52] U.S. Cl. ................................... 100/35; 100/162 B; 100/170; 100/176; 72/243; 29/116.2
[58] Field of Search ...................... 100/176, 162 B, 35, 100/170, 155 R; 29/116 AD, 113 AD; 72/243, 245, 239

[56] References Cited

U.S. PATENT DOCUMENTS

| | | | |
|---|---|---|---|
| 3,097,590 | 7/1963 | Justus | 100/155 R |
| 4,327,468 | 5/1982 | Kusters et al. | 100/170 |
| 4,399,747 | 8/1983 | Schiel et al. | 100/170 X |
| 4,414,890 | 11/1983 | Schiel et al. | 100/162 B |
| 4,440,077 | 4/1984 | Schiel | 29/116 AD |
| 4,453,299 | 6/1984 | Hemmi | 29/116 AD |
| 4,455,727 | 6/1984 | Tschirner | 29/116 AD X |
| 4,480,459 | 11/1984 | Feldman et al. | 100/162 B X |
| 4,502,312 | 3/1985 | Marchioro | 100/162 B |
| 4,709,571 | 12/1987 | Guttinger | 100/162 B |

Primary Examiner—Andrew M. Falik
Attorney, Agent, or Firm—Steinberg & Raskin

[57] ABSTRACT

A method and apparatus for obtaining substantially uniform profiles of the roll mantles of an adjustable-crown roll and a counter-roll at a nip formed therebetween wherein the bearing distance of the counter-roll is substantially larger than the bearing distance of the adjustable-crown roll and wherein the nip is loaded by load forces applied to one or both rolls, preferably at regions of the bearings. A compensation moment is produced by devices situated within the mantle of the adjustable-crown roll between the bearings thereof loading both end regions of the roll mantle, the magnitude of the moment adjustable by adjusting the moment-producing compensation force such that the profiles of the deflected roll mantles of the adjustable-crown roll and the counter-roll at the nip are substantially uniform.

6 Claims, 6 Drawing Sheets

METHOD AND APPARATUS FOR CONTROLLING DEFLECTION OF AN ADJUSTABLE CROWN ROLL

BACKGROUND OF THE INVENTION

The present invention relates generally to methods for obtaining substantially uniform profiles or shapes of the lines of deflection of the roll mantles of an adjustable or variable-crown roll and a counter-roll at a nip formed between them, wherein the bearing distance of the counter-roll is substantially larger than the corresponding bearing distance of the adjustable-crown roll, and wherein the load in the nip between the rolls is produced by loading forces applied to one or both of the adjustable-crown roll and the counter-roll, such as at regions of the bearings thereof.

The present invention also relates generally to variable-crown rolls including a fixed, central axle and a roll mantle rotatably mounted on the axle defining a space therebetween in which apparatus for adjusting the nip profile formed by the roll with a counter-roll can be adjusted. Such nip profile adjustment apparatus can include hydrodynamic glide-shoes mounted on pressure fluid controlled loading-pistons or one or more pressure-fluid chambers occupying the space between the central axle and the inner surface of the roll mantle. The glide-shoe piston devices or the like are arranged to act substantially in the plane of the nip or symmetrically with respect to the nip. The roll mantle is rotatably journalled on the central axle at regions proximate to both of its ends by means of bearings while the fixed central axle is typically supported at locations axially outside of the locations at which the roll mantle is journalled on the central fixed shaft.

Variable-crown rolls of the type described above are commonly used in paper machines to form dewatering press nips, smoothing nips, calendering nips and the like with counter-rolls. For such purposes, it is important that the distribution of the linear load, i.e., the profile of the nip in the axial direction of the rolls, is either constant or adjustable as desired, such, for example, so as to control the transverse moisture profile and/or thickness profile or caliper of the web. There are many examples in the prior art of variable or adjustable-crown rolls which are designed in an attempt to provide adjustability for the distribution of the linear load in a nip formed by such rolls and corresponding counter-rolls.

Conventional adjustable- or variable-crown rolls used in paper machines generally comprise either a solid or tubular, fixed central roll axle or shaft and a roll mantle rotatably mounted around the fixed axle. Hydraulic pressure-actuated glide-shoe arrangements and-/or one or a series of pressure-fluid chambers are arranged within the space between the fixed axle and the roll mantle for aligning or adjusting the axial profile of the mantle at the nip. Generally, the nips formed by such variable-crown rolls, such as press nips or calendering nips, are loaded by means of forces applied to the axle journals of the variable-crown roll and/or the associated counter-roll.

Reference is made to FI patent application Ser. No. 822,393, corresponding to U.S. Pat. No. 4,414,890 FI published patent applications Nos. 67,923 and 69,913 corresponding to U.S. Pat. Nos. 4,327,468 and 4,440,077 respectively, and U.S. Pat. No. 3,097,590 as representative of relevant prior art.

The counter-roll forming the nip with the variable-crown roll generally is rotatably mounted on axle journals which are permanently fixed to the mantle of the counter-roll. On the other hand, the variable-crown roll is journalled on the fixed, central axle, which is generally quite massive. The distance between the opposite journal bearings of the counter-roll usually differs from the corresponding distance between the journal bearings of the variable-crown roll, the latter usually being substantially smaller than the former, thereby resulting in certain drawbacks discussed in greater detail with reference to FIG. A.

For example, the difference between the bearing distances of the variable-crown roll and its counter-roll can result in the shapes of the crowns of the variable-crown roll and its counter-roll differing from each other. Various attempts have been made to resolve this problem. For example the rolls can be crowned. However, this technique will result in a uniform nip profile at only one particular linear load. Heating devices have been used in calender rolls to heat the roll mantle at portions at which higher linear loads are desired. However, such techniques also have their own limitations and drawbacks. Attempts have also been made to obtain a uniform nip profile by designing the variable-crown roll to have an extended bearing distance. However, this technique only results in creating new problems in connection with the frame construction of the paper machine. It has also been suggested to use an articulated bearing and a rolling bearing, situated one over the other, in the journalling of a variable-crown roll and its counter-roll to obtain a uniform nip profile. However, this technique requires a significant amount of space. Still other techniques for obtaining a uniform nip profile have been suggested, such as so-called self-acting counter-moment rolls.

It has also been suggested to provide a variable-crown roll with an extended mantle so that the bearing distances of the variable-crown roll and counter-roll are substantially equal (see, e.g. FIG. B). In such arrangements, the crown line of the variable-crown roll will substantially correspond to the crown line of the counter-roll whereby the caliper profile of the nip formed by the variable-crown roll and the counter-roll is substantially uniform, as discussed in greater detail with reference to FIGS. B and D. Extending the mantle of the variable-crown roll, however, results in numerous drawbacks.

SUMMARY OF THE INVENTION

It is an object of the present invention to provide new and improved methods for controlling the deflection of an adjustable-crown roll to obtain substantially uniform profiles of the roll mantles of the adjustable-crown roll and a counter-roll at a nip formed between them.

Another object of the present invention is to provide new and improved adjustable-crown rolls including apparatus for controlling the deflection thereof to obtain substantially uniform profiles of the roll mantles of the adjustable-crown roll and a counter-roll at a nip formed between them.

Still another object of the present invention is to provide new and improved apparatus and methods for obtaining substantially uniform profiles of the roll mantles of an adjustable-crown roll and a counter-roll at a nip formed between them and which avoid the drawbacks of conventional arrangements discussed above.

Briefly, in accordance with the method of the invention, these and other objects are attained by providing a method including producing compensation moments which load the end regions of the roll mantle of the adjustable-crown roll by providing devices within the roll mantle between the bearings thereof which are operable to produce moment-producing compensation forces, and adjusting the magnitudes of the compensation moments by adjusting the magnitudes of the compensation forces until the profiles of the deflected roll mantles of the adjustable-crown roll and the counter-roll at the nip formed thereby are substantially uniform.

An adjustable-crown roll according to the invention includes annular end members connected to respective ends of the roll mantle, each end member including a projecting component having a glide surface, and glide-shoe means for applying adjustable compensation forces on the glide surface of each of the projecting components for producing the compensation moments which load the respective end regions of the roll mantle.

In this manner, compensation moments can be produced which load the end regions of the roll mantle without having to provide an extension of the roll mantle. Such adjustable compensation moments can be produced by using an axially projecting sleeve component, a radially projecting ring-shaped flange component, or any other equivalent component inside of the roll mantle on which a compensation force is applied, such for example as by glide-shoe means loaded by piston-cylinder arrangements, by means of which the compensation moments are produced without interfering with the loading of the nip.

The compensation moments for obtaining substantially uniform profiles of the roll mantles at the nip can be produced by hydrostatic glide shoes or the like which are similar to those used in conventional variable-crown rolls for controlling the deflection of the roll.

DESCRIPTION OF THE DRAWINGS

A more complete appreciation of the present invention and many of the attendannt advantages thereof will be readily understood by reference to the following detailed description when considered in connecting with the accompanying drawings in which.

FIG. A is a schematic view of a prior art adjustable-crown roll forming a nip with a counter-roll and wherein the bearing distance of the counter-roll is greater than the bearing distance of the roll mantle of the adjustable-crown roll.

FIG. B is a schematic view of a prior art adjustable-crown roll forming a nip with a counter-roll wherein the mantle of the adjustable-crown roll is extended by end sleeves and wherein the bearing distance of the counter-roll is substantially equal to the bearing distance of the roll mantle of the adjustable-crown roll.

FIG. C is a graphical illustration showing the caliper profile of the nip shown in FIG. A in the cross-machine direction.

FIG. D is a graphical illustration showing the caliper profile of the nip shown in FIG. B in the cross-machine direction.

DETAILED DESCRIPTION OF THE PREFERRED EMBODIMENTS

Conventional arrangements and their drawbacks will first be described with reference to FIGS. A-D. Referring first to FIG. A, a nip N is formed between a counter-roll 20 and a variable-crown roll 40. Counter-roll 20 includes a mantle 23 to which axle journals 21a and 21b are fixedly attached. The counter-roll 20 is rotatably mounted on axle journals 21a and 21b by means of bearings 22a and 22b, the counter-roll bearings 22a and 22b being spaced by a bearing distance $L_0$. The variable-crown roll 40 comprises a stationary central axle 41 on which a hollow roll mantle 43 is rotatably mounted by roll mantle bearings 42a and 42b spaced from each other by a bearing distance $L_1$. Crown-adjustment means 45 such, for example, as a series of glide shoes or a row of fluid chambers, are provided in the space defined between the central axle 41 and the inner surface of the hollow roll mantle 43 for acting in a plane containing the nip N for adjusting the profile of the nip by adjusting the crown of the roll 40. The bearing distance $L_0$ of counter-roll 20 is greater than the bearing distance $L_1$ of the variable-crown roll 40. In particular, each counter-roll bearing 22a, 22b is spaced a distance a outwardly of a corresponding roll-mantle bearing 42a, 42b so that $2 \times a = L_0 - L_1$. When the counter-roll 20 applies a uniform linear load q, produced by means of forces F applied in the regions of the counter-roll bearings, it is deflected by the linear load q and by the moment produced at its end regions. The moment M active on the counter-roll 20 at regions corresponding to the ends of the bearing distance $L_1$ of the variable-crown roll 40 can be represented by $$M = F \times a = q \times L_1 \times a/2 \qquad (1)$$

Thus, the moment M acting on the end regions of the counter-roll is proportional to the linear load q so that the form of the profile of the deflected roll mantle of counter-roll 20 is constant for any given linear load q while the magnitude of the deflection of the counter-roll mantle will vary proportionally to the magnitude of the load q. However, since the bearings 42a and 42b of the variable-crown roll 40 shown in FIG. A are situated within the mantle 43, the force applied to the bearings 42a and 42b will not produce any moment which acts on the mantle 43 at the zones of roll-mantle bearings 42a, 42b, i.e., at the ends of the bearing distance $L_1$. This means that the mantle 43 will be deflected with a different profile than that of the deflected mantle 23 of counter-roll 20. For this reason the caliper profile $CP_A$ of the nip N of FIG. A is typified by the graphical illustration of FIG. C having two peaks $CP_1$ and $CP_2$. It is an object of the invention to avoid caliper profiles having such sharp peaks.

Referring now to the arrangement shown in FIG. B, a nip N is formed between a prior-art variable-crown roll 50 and a counter-roll 20, the latter being similar to the counter-roll of FIG. A. The variable-crown roll 50 is provided with a stationary central axle 51 on which a hollow roll mantle 53 is rotatably mounted. In particular, sleeve-shaped extensions 56a are connected to the ends of roll mantle 53. The mantle 53 is journalled on the central axle 51 by means of bearings 52a and 52b which are provided within the sleeve-shaped extensions at their outer ends so that the bearing distance of the variable-crown roll is substantially equal to the bearing distance of the counter-roll 20, namely, $L_0$.

As in the case of the adjustable-crown roll shown in FIG. A, a glideshoe or pressure chamber arrangement 55 is provided in the space between the central axle 51 and the roll mantle 53 by means of which a controlled loading $q_s$ is produced on the inner surface of the mantle 53.

The nip arrangement shown in FIG. B results in a caliper profile $CP_B$ of the type shown in FIG. D which is relatively uniform having only relatively small "valleys" $CP_3$ and $CP_4$ at the lateral regions of the nip N which are caused by the weight of the ends of the roll 50.

However, the arrangement of FIG. B has its own drawbacks, especially in the construction of the frame for the nip-defining rolls. It is also a drawback that the planes in which the loading or supporting forces F are applied to the ends of the variable-crown roll 50 are necessarily located at a considerable distance b from the plane of the bearings 22a, 52a and 22b, 52b.

An important object of the present invention is to eliminate the drawbacks described above in the rolls and nips N of FIGS. A and B and to provide a caliper profile for a nip N which is even more uniform than the profile $CP_B$ shown in FIG. D.

Figure 1:
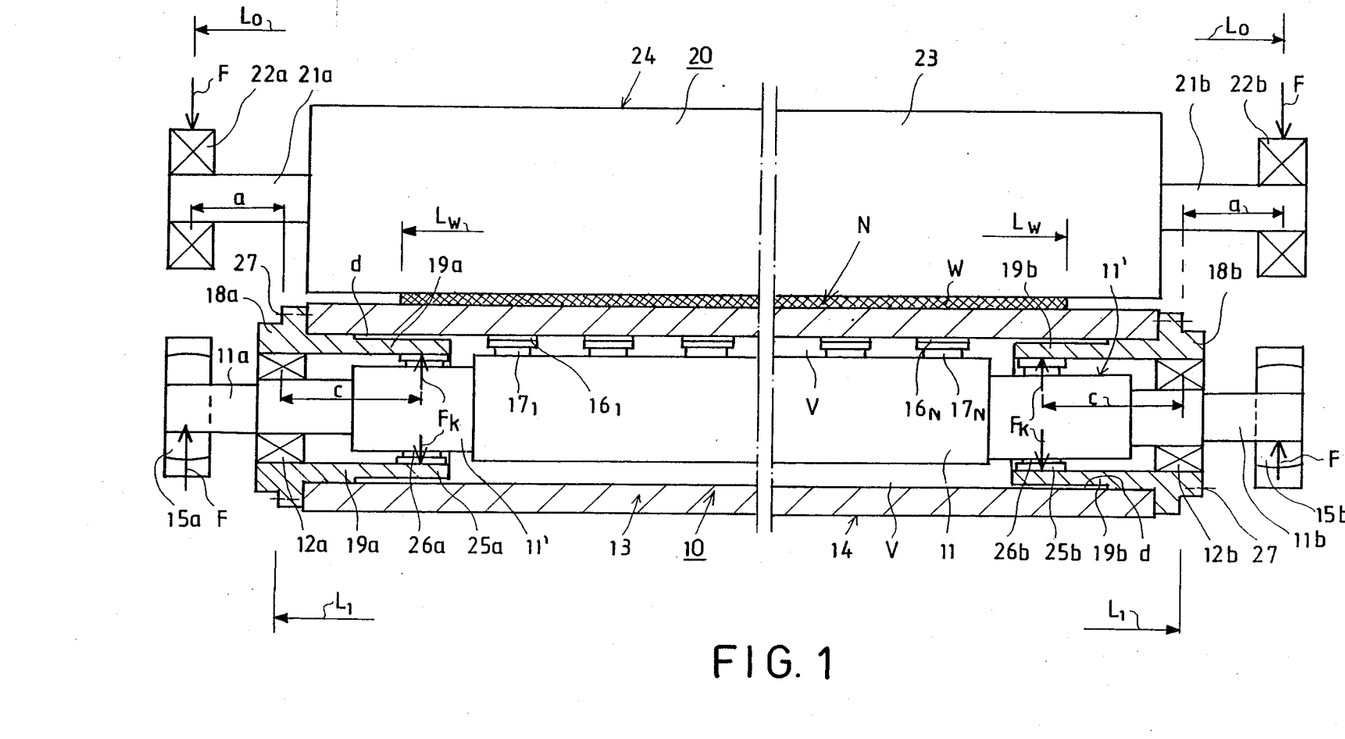
FIG. 1 is a front elevation view of an adjustable-crown roll forming a nip with a counter-roll and including apparatus for performing a method in accordance with the invention.

Referring now to FIG. 1 wherein an arrangement in accordance with the invention is illustrated, a nip N through which a web having a width $L_w$ runs, either with or without one or more felts, is formed between a counter-roll 20 of conventional construction as described above and an adjustable-crown roll 10 in accordance with the invention. The mantles 13, 23 of the adjustable-crown roll 10 and counter-roll 20 may have smooth surfaces 14, 24 as shown or, alternatively, may be provided with a grooved construction in which case a separate felt will generally pass through the nip N. The counter-roll 20 is mounted by means of axle journals 21a and 21b in bearings 22a and 22b having a bearing distance $L_0$. Coverings 28 (FIG. 2) may be provided over the bearings 12a and 12b. The adjustable-crown roll 10 is mounted to the frame by bearings 15a and 15b which receive the outermost end portions 11a and 11b of the stationary central axle 11. The rotating mantle 13 of adjustable-crown roll 10 has a bearing distance $L_1$ between bearings 12a and 12b which is shorter than the bearing distance $L_0$ of the counter-roll 20, so that $L_0 - L_1 = 2 \times a$.

A series of glide shoes $16_1$–$16_N$ is fitted in the space between the stationary central axle 11 and the rotating mantle 13. The glide shoes are loaded by pistons $17_1$–$17_N$ situated in cylinder bores (not shown) formed in the axle 11. The loading is accomplished by introducing fluid under pressure into the piston cylinders so that the profile of the nip N can be adjusted by adjusting the fluid pressure in a conventional manner.

Figure 2:
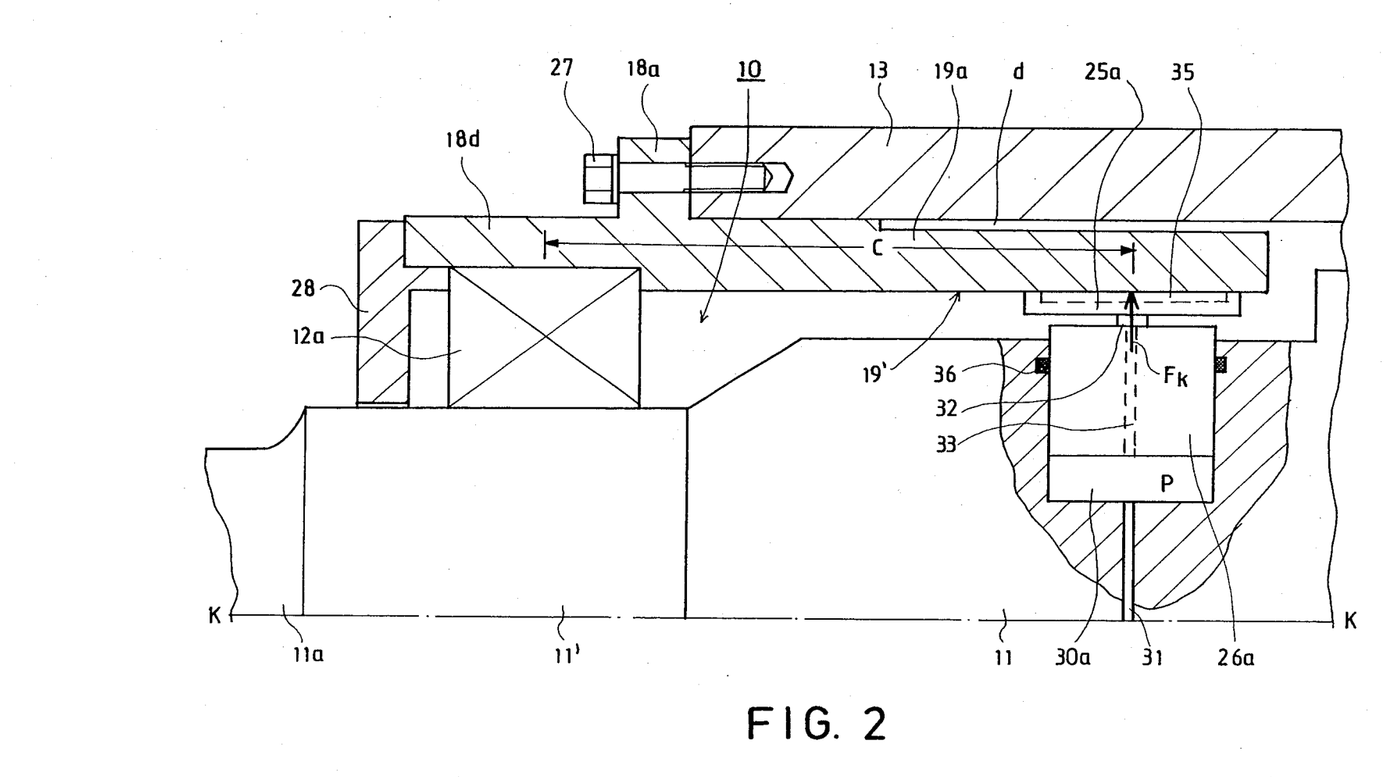
FIG. 2 is an enlarged view of a variation of the embodiment of the invention illustrated in FIG. 1.

According to a first embodiment of the invention illustrated in FIGS. 1 and 2, annular end members 18a and 18b are connected to respective ends of the hollow roll mantle 13 of the adjustable-crown roll 10 by means of threaded fasteners 27 or the like. The annular end members 18a and 18b each include a projecting component which in the illustrated embodiment comprises an axially projecting sleeve-shaped component 19a, 19b that extends axially into the mantle 13 substantially coaxially with the roll mantle and has a substantially cylindrical inner surface 19' comprising a glide surface adapted to be acted upon by compensation forces as described below. Sleeve-shaped component 19a, 19b has an outer radius which is smaller than an inner radius of the roll mantle 13 to provide a certain play d between the outer surface of the sleeve-like component 19a, 19b and the inner surface of the roll mantle 13. The end regions of the fixed central axle 11 are each formed with a first reduced diameter portion 11' and located within respective sleeve-like components and outer journal portions 11a, 11b respectively at the ends of which articulation bearings 15a and 15b mount the central shaft fixed against rotation.

Cylinder bores 30a, 30b are formed in the reduced-diameter portions 11' of the central axle 11. Pistons 26a, 26b provided with seals 36 (FIG. 2) are situated within respective cylinder bores. Glide shoes 25a, 25b are supported on the outer surfaces of pistons 26a, 26b by means of articulated joints 32. When the pistons 26a, 26b are loaded by pressurized fluid, the glide shoes 25a, 25b are urged against the smooth glide surfaces 19' of the sleeve-shaped components 19a, 19b. Two oppositely acting pistons 26a, 26a; 26b, 26b are provided at each end region of the fixed central shaft so that there are two pairs of pistons 26 in total.

When fluid under an adjustable pressure p is passed through ducts 31 into the cylinder spaces 30a, 30b defined by pistons 26a, 26b and the cylinder bores, some of the pressurized fluid passes into the spaces 35 in the glide shoes 25a, 25b through bores 33 in the pistons 26a, 26b and the glide shoes are urged against the glide surfaces 19' to produce compensation forces $F_k$. These compensation forces $F_k$ have a torque arm c having a length equal to the distance between the line of action of the compensation force and a plane containing a respective one of the bearings 12a, 12b. By pressurizing those cylinder spaces 30a, 30b of pistons 26a, 26b that face the nip N at both of the end regions of the adjustable-crown roll, a downwardly directed bending moment $M_k$ is produced. Alternatively, by suitably pressurizing the pistons on the opposite side of the central axle, i.e., directed away from the nip N, an upwardly directed bending moment is produced which is indicated if the counter-roll 20 is deflected towards the nip N by its own weight. The bending moment $M_k$ is represented by the equation:

$$M_k = c \times F_k \qquad (2)$$

By suitable adjustment of the pressure p within the cylinder chambers, the moment $M_k$ can be adjusted so that the moment M acting on the end regions of the counter-roll 20 designated by the equation (1) is proportional or equivalent to the moment $M_k$ obtained from equation (2), the profiles of the deflected roll mantles 13 and 23 of the adjustable-crown roll 10 and counter-roll 20 can be made substantially uniform at the nip. Thus, the caliper profile of the nip N can be made uniform to an extent greater than even the example shown in FIG. D.

The operation of the embodiment of the invention illustrated in FIG. 1 will now be described. The application of the compensation forces $F_k$ on the glide surfaces of the annular end members 18a and 18b produce respective compensation moments $M_k$. The magnitude of the compensation forces are adjusted to produce a moment pattern which obtains substantially uniform profiles of the roll mantles 13, 20 of adjustable-crown roll 10 and counter-roll 20 at the nip N. The full magnitude of the compensation moments act on the roll mantle 13 from the points of the roll mantle at which the sleeve-shaped projecting components 19a and 19b last contact the inner surface of the mantle 13. This is to be contrasted to prior art arrangements wherein the full value of the moment pattern is not effective at the ends of the roll. Rather, in prior art arrangements, the moment increases between the roll mantle bearing and the first glide shoe in a linear manner from zero to the desired constant moment value.

Where two opposed glide-shoe devices are used within the sleeve-shaped components 19a, 19b, i.e., a glide-shoe device situated above the central axle and beneath the central axle, it will be understood that they generally will not be active at the same time to produce compensation forces $F_k$ since this would have the effect of one cancelling the effect of the other. Referring to FIG. 1, when it is desired to bend the end regions of the mantle 13 of roll 10 downwardly at the nip N, the upwardly directed compensation force $F_k$ is adjusted to act upon the upper glide shoe 25a, 25b. On the other hand, when the end regions of mantle 13 of roll 10 are desired to be bent upwardly, the glide shoe 25a, 25b situated below the central axle 11 is acted upon by the compensation force $F_k$.

Figure 3:
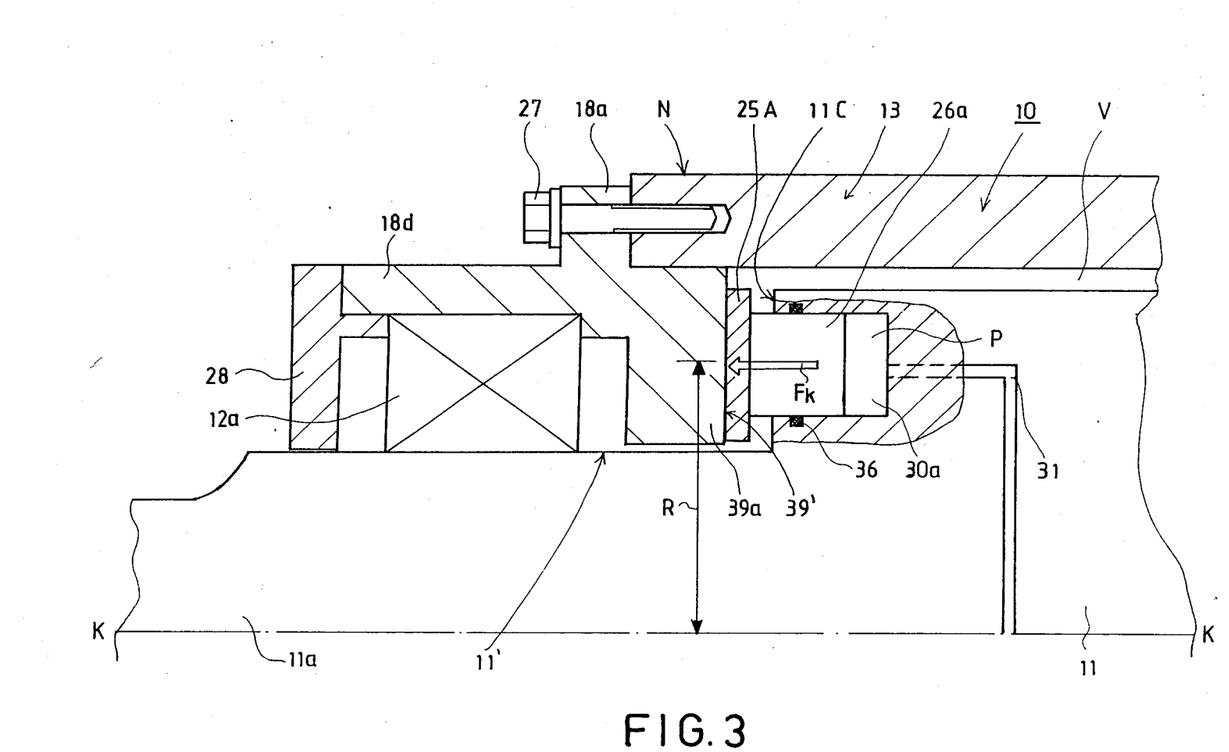
FIG. 3 is an enlarged view similar to FIG. 2 of a second embodiment of an adjustable-crown roll including apparatus for performing a method in accordance with the invention.

As seen in FIGS. 1 and 2, the compensation force $F_k$ which produces the moment $M_k$ is directed in a radial plane of the variable-crown roll 10. However, the invention may also be carried out so that the compensation force is applied in other directions. In this connection, referring to FIG. 3 wherein an arrangement is shown where the compensation forces are applied in directions substantially parallel to the axis of roll 10, annular end members 18a and 18b (end member 18b not shown) are connected to respective ends of the roll mantle 13 of the adjustable-crown roll 10. The annular end members 18a, 18b are provided with radially projecting flange components 39a, 39b having smooth inner glide surfaces 39' situated in radial planes. Pistons 26a, 26b (piston 26b is situated below the central axis of central axle 11 and is not shown) are positioned in axially extending cylinder bores 30a, 30b which open into plane 11c of axle 11 and are coupled to respective glide shoes 25A, 25B in accordance with the principle of the operation of FIG. 1. Thus, two pairs of pistons are adapted to be urged in an axial direction under pressure P by hydraulic fluid admitted to the cylinder chamber through ducts 31 to bear against the glide surfaces 39'. In this manner, compensation forces $F_k$ are produced, the magnitudes of which are adjustable by adjusting the pressure P of the hydraulic fluid. The compensation forces $F_k$ produce moments $M_k$ which act to bend the ends of the mantle 13 of roll 10 in a manner similar to the embodiment of FIG. 1. The moment $M_k$ is represented by the equation $$M_k = F_k \times R, \qquad (3)$$

where R is the length of the torque arm which in this instance is the distance between the line of action of the compensation force $F_k$ and the central axis K—K of the adjustable-crown roll. In other respects, the construction of the embodiment of FIG. 3 is similar to that described above in connection with the embodiment of FIGS. 1 and 2.

Figure 4:
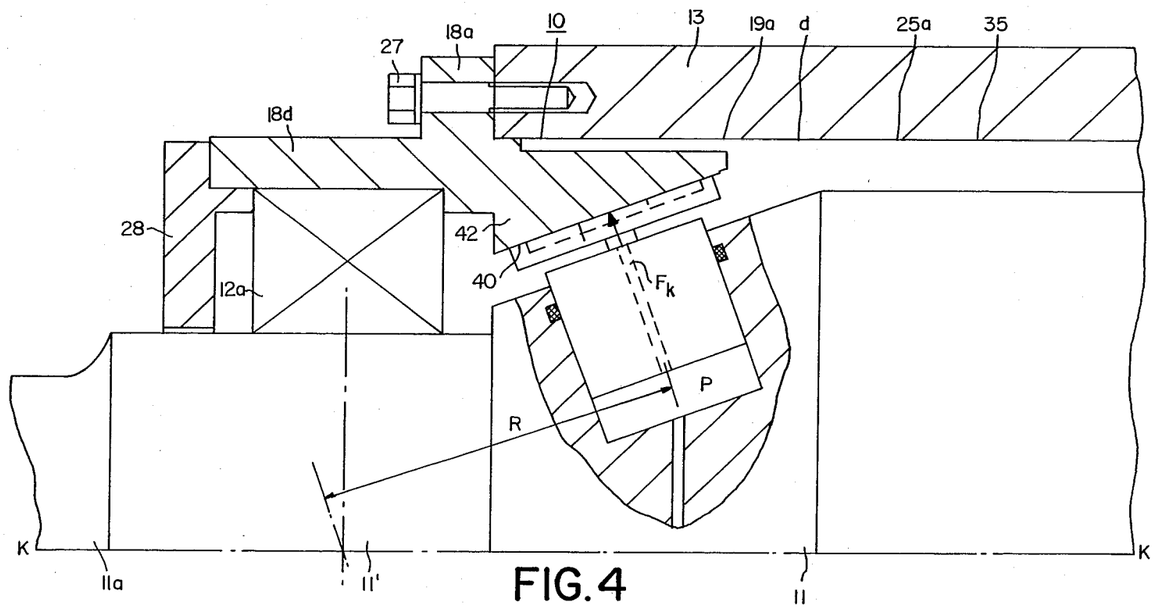
FIG. 4 is an enlarged view similar to FIGS. 2 and 3 of a third embodiment of an adjustable-crown roll including apparatus for performing a method in accordance with the invention.

It will be understood that the compensation forces $F_k$ may be applied in directions intermediate of the axial and radial directions by forming appropriate oblique glide surfaces on the projecting components of the annular end members against which suitably configured glide-shoes act. In this connection, reference is made to FIG. 4 wherein an arrangement is shown in which oblique guide surfaces 40 are formed on the projecting components 42 of annular end members 18a, 18b. Components of the arrangement of FIG. 4 corresponding to those of FIG. 3 are designated by like reference characters.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. A method for obtaining uniform profiles of roll mantles of an adjustable-crown roll and a counter-roll at a nip formed therebetween, wherein the adjustable-crown roll includes a fixed central axle and a hollow roll mantle rotatably mounted on the axle by bearings spaced from each other by a first bearing distance, and wherein the counter-roll is mounted on axle journals fixed to the counter-roll mantle by bearings spaced from each other by a second bearing distance which is larger than the first bearing distance, and wherein the nip formed between the adjustable-crown roll and the counter-roll is loaded by applying load forces to one or both of the adjustable-crown roll and the counter-roll, comprising the steps of:

providing devices inside the hollow mantle of the adjustable-crown roll and within the first bearing distance operable for producing a compensation force which in turn produces a compensation moment which loads a respective end region of the roll mantle of the adjustable-crown roll;

loading each end region of the adjustable-crown roll by a compensation moment through operation of said devices, said compensation moment being produced by directing the compensation force in a direction substantially parallel to the axis of the adjustable-crown roll upon components within the roll mantle of the adjustable-crown roll and wherein the compensation force has a torque arm having a length equal to the distance between the line of action of the compensation force and the central axis of the adjustable-crown roll; and adjusting the magnitude of said compensation moment by adjusting the magnitude of the compensation force whereby the profiles of the deflected roll mantles of the adjustable-crown roll and the counter-roll at the nip formed therebetween are adjustable to be substantially uniform.

2. A method for obtaining uniform profiles of roll mantles of an adjustable-crown roll and a counter-roll at a nip formed therebetween, wherein the adjustable-crown roll includes a fixed central axle and a hollow roll mantle rotatably mounted on the axle by bearings spaced from each other by a first bearing distance, and wherein the counter-roll is mounted on axle journals fixed to the counter-roll mantle by bearings spaced from each other by a second bearing distance which is larger than the first bearing distance, and wherein the nip formed between the adjustable-crown roll and the counter-roll is loaded by applying load forces to one or both of the adjustable-crown roll and the counter-roll, comprising the steps of:

provide devices inside the hollow mantle of the adjustable-crown roll and within the first bearing distance operable for producing a compensation force which in turn produces a compensation moment which loads a respective end region of the roll mantle of the adjustable-crown roll, said devices including a projecting component of an annular end member connected to a respective end of the roll mantle of the adjustable-crown roll, said projecting component situated within the roll mantle and having a glide surface, and piston-glide shoe assemblies arranged to act between the fixed central axle of the adjustable-crown roll and said glide surface of said projecting component;

loading each end region of the adjustable-crown roll by a compensation moment through operation of said devices by applying pressure to the piston-glide shoe assemblies; and adjusting the magnitude of said compensation moment by adjusting the pressure acting on the piston-glide shoe assemblies to adjust the magnitude of the compensation force whereby the profiles of the deflected roll mantles of the adjustable-crown roll and the counter-roll at the nip formed therebetween are adjustable to be substantially uniform.

3. An adjustable-crown roll comprising:

a fixed central axle having end regions;

a hollow roll mantle rotatably mounted on said axle by roll mantle bearings situated proximate to ends of said roll mantle, said fixed central axle being supported by articulation bearings situated laterally outside corresponding ones of said roll mantle bearings;

means situated in a space defined between said central axle and said roll mantle for acting in a plane containing the nip for adjusting the profile of the nip;

annular end members connected to respective ends of said roll mantle, each end member including a projecting component having a glide surface and comprising an axially extending sleeve-shaped component having an axial length and which is substantially coaxial with said roll mantle, said sleeve-shaped component having an outer radius which is smaller than an inner radius of said roll mantle, said glide surface comprising an inner substantially cylindrical surface of said sleeve-shaped component;

means for applying an adjustable compensation force against said glide surface of each of said projecting components for producing a compensation moment which loads the respective end region of the roll mantle, said means for applying a compensation force comprising at least one glide shoe situated on each of opposed sides of said central axle at each end region thereof adapted to act upon said glide surface of a sleeve-shaped component of a respective annular end member substantially in a plane containing the nip; and cylinder-piston means arranged to act between each of said glide shoes and said central axle, said cylinder-piston means each including a radially extending cylinder bore formed in a respective end region of said central axle and a piston situated in said cylinder bore and adapted to act on a respective glide shoe, such that a substantially radially directed compensation force is produced by loading a respective piston to press a respective glide shoe against said glide surface of a sleeve-shaped component of a respective annular end member, said compensation force having a torque arm having a length equal to the distance between the line of action of the compensation force and a plane passing through a respective one of said mantle bearings mounting said roll mantle on said central axle;

whereby when said adjustable-crown roll forms a nip with a counter-roll, the profiles of the roll mantles of the adjustable-crown roll and the counter-roll at the nip formed thereby being adjustable to be substantially uniform by adjusting the magnitude of said compensation moments produced by said means for applying an adjustable compensation force.

4. An adjustable-crown roll comprising:

a fixed central axle having end regions;

a hollow roll mantle rotatably mounted on said axle by roll mantle bearings situated proximate to ends of said roll mantle, said fixed central axle being supported by articulation bearings situated laterally outside corresponding ones of said roll mantle bearings;

means situated in a space defined between said central axle and said roll mantle for acting in a plane containing the nip for adjusting the profile of the nip;

annular end members connected to respective ends of said roll mantle, each end member including a projecting component having a glide surface and comprising a ring-shaped flange projecting radially within said roll mantle, said glide surface comprising an inner substantially planar surface of said ring-shaped flange component;

means for applying an adjustable compensation force against said glide surface of each of said projecting components for producing a compensation moment which loads the respective end region of the roll mantle, said means for applying a compensation force comprising at least one glide shoe adapted to act upon said glide surface of said ring-shaped flange component of a respective annular end member; and cylinder-piston means for loading said glide shoes, said cylinder-piston means each including an axially extending cylinder bore formed at a respective end region of said central axle, and a piston situated in said cylinder bore and adapted to act on a respective glide shoe, such that a substantially axially directed compensation force is produced by loading a respective piston to press a respective glide shoe against said glide surface of a respective ring-shaped flange component of a respective annular end member, said compensation force having a torque arm having a length equal to the distance between the line of action of the compensation force and the central axis of the adjustable-crown roll;

whereby when said adjustable-crown roll forms a nip with a counter-roll, the profiles of the roll mantles of the adjustable-crown roll and the counter-roll at the nip formed thereby being adjustable to be substantially uniform by adjusting the magnitude of said compensation moments produced by said means for applying an adjustable compensation force.

5. The combination of claim 4 wherein said central axle has an outwardly facing radial shoulder at each of its end regions and wherein said cylinder bore opens outwardly from said radial shoulder.

6. An adjustable-crown roll comprising:

a fixed central axle having end regions;

a hollow roll mantle rotatably mounted on said axle by roll mantle bearings situated proximate to ends of said roll mantle, said fixed central axis being supported by articulation bearings situated laterally outside corresponding ones of said roll mantle bearings;

means situated in a space defined between said central axle of and said roll mantle for acting in a plane containing the nip for adjusting the profile of the nip;

annular end members connected to respective ends of said roll mantle, each end member including a projecting component having a glide surface, said projecting component of each of said annular end members being situated within said roll mantle and said glide surface of each of said projecting components extending around said central axle; and means for applying an adjustable compensation force against said glide surface of each of said projecting components for producing a compensation moment which loads the respective end region of the roll mantle;

whereby when said adjustable-crown roll forms a nip with a counter-roll, the profiles of the roll mantles of the adjustable-crown roll and the counter-roll at the nip formed thereby being adjustable to be substantially uniform by adjusting the magnitude of said compensation moments produced by said means for applying an adjustable compensation force.

* * * * *